US012706514B2

(12) United States Patent
Hiemstra et al.

(10) Patent No.: US 12,706,514 B2
(45) Date of Patent: Aug. 11, 2026

(54) ELECTROMAGNETIC ACTUATOR

(71) Applicant: Apple Inc., Cupertino, CA (US)

(72) Inventors: David Hiemstra, Santa Clara, CA (US); Nils E. Larson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 18/222,672

(22) Filed: Jul. 17, 2023

(65) Prior Publication Data

US 2024/0079941 A1 Mar. 7, 2024

Related U.S. Application Data

(60) Provisional application No. 63/404,075, filed on Sep. 6, 2022.

(51) Int. Cl.
*H02K 33/02* (2006.01)
*H02K 5/04* (2006.01)

(52) U.S. Cl.
CPC ............... *H02K 33/02* (2013.01); *H02K 5/04* (2013.01)

(58) Field of Classification Search
CPC .. H02K 5/00; H02K 5/04; H02K 5/17; H02K 5/173; H02K 5/22; H02K 5/225; H02K 33/00; H02K 33/02; H02K 33/16; H02K 33/18; H01F 7/00; H01F 7/02; H01F 7/028; H01F 7/0289; H01F 7/06; H01F 7/064; H01F 7/066; H01F 7/16; H01F 7/164; H01F 7/1646; H01F 7/163; H01F 7/1638; H01F 7/165; H01F 7/1653; H01F 41/00; H01F 41/06; H01F 41/064; G06F 1/00; G06F 1/01; G06F 1/016; G06F 1/163; G06F 3/00; G06F 3/01; G06F 3/016; G06F 3/04;
(Continued)

(56) References Cited

U.S. PATENT DOCUMENTS 5,892,629 A * 4/1999 Nishihara ............ G11B 7/0932
720/682
6,243,078 B1 6/2001 Rosenberg
(Continued)

FOREIGN PATENT DOCUMENTS

JP 2008141857 6/2008

OTHER PUBLICATIONS

U.S. Appl. No. 18/221,773, filed Jul. 13, 2023, Hiemstra et al.

*Primary Examiner* — Oluseye Iwarere
*Assistant Examiner* — Nicholas Lee Setzer
(74) *Attorney, Agent, or Firm* — Brownstein Hyatt Farber Schreck, LLP

(57) ABSTRACT

An electronic device includes a housing. The housing includes a first plate defining a first wall; a cover defining a second wall opposite the first wall, a first sidewall, and a second sidewall opposite the first sidewall; and a second plate and a third plate, respectively defining a third sidewall, and a fourth sidewall opposite the third sidewall. The first, second, third, and fourth sidewalls extend between the first wall and the second wall. The electronic device further includes a movable mass disposed within the first, second, third, and fourth sidewalls of the housing; a first spring and a second spring, respectively attached to first and second opposite ends of the movable mass; and a first material and a second material, respectively joining the first spring to the second plate and the second spring to the third plate.

21 Claims, 6 Drawing Sheets

(58) Field of Classification Search
CPC ......... G06F 3/048; G06F 3/0488; G11B 7/00; G11B 7/093; G11B 7/0932; G11B 7/0935; G11B 7/22; G08B 6/00; B06B 1/00; B06B 1/04; B06B 1/045; H04M 19/00; H04M 19/04; H04M 19/047
See application file for complete search history.

(56) References Cited

U.S. PATENT DOCUMENTS

| | | | | |
|---|---|---|---|---|
| 6,610,942 | B1* | 8/2003 | Anderson | H01H 1/5866 310/68 E |
| 8,283,839 | B2 | 10/2012 | Heim | |
| 8,411,427 | B2 | 4/2013 | Jeong et al. | |
| 9,607,491 | B1 | 3/2017 | Mortiner et al. | |
| 9,821,672 | B2 | 11/2017 | Chae et al. | |
| 10,146,309 | B2 | 12/2018 | Tissot et al. | |
| 10,726,258 | B2 | 7/2020 | Park et al. | |
| 10,952,427 | B2 | 3/2021 | Kwon et al. | |
| 11,002,589 | B1 | 5/2021 | Zhang et al. | |
| 11,177,680 | B2 | 11/2021 | Lee et al. | |
| 11,246,229 | B2 | 2/2022 | Lee et al. | |
| 2002/0051557 | A1 | 5/2002 | Kobayashi et al. | |
| 2011/0316361 | A1 | 12/2011 | Park et al. | |
| 2012/0187780 | A1* | 7/2012 | Bang | H02K 33/16 310/25 |
| 2014/0035397 | A1* | 2/2014 | Endo | H02K 33/18 310/30 |
| 2017/0070131 | A1 | 3/2017 | Degner et al. | |
| 2017/0127166 | A1 | 5/2017 | Noma | |
| 2017/0214306 | A1 | 7/2017 | Katada | |
| 2020/0289001 | A1 | 9/2020 | Mantrawadi et al. | |
| 2020/0393397 | A1 | 12/2020 | Vulto et al. | |
| 2021/0075306 | A1* | 3/2021 | Little | H02K 33/02 |
| 2021/0252388 | A1 | 8/2021 | VanWyk et al. | |
| 2022/0101992 | A1 | 3/2022 | Porter et al. | |
| 2023/0168740 | A1 | 6/2023 | Larson et al. | |
| 2023/0275498 | A1 | 8/2023 | Ikezoe et al. | |
| 2024/0079940 | A1 | 3/2024 | Hiemstra et al. | |
| 2025/0111974 | A1 | 4/2025 | Amin-Shahidi et al. | |

* cited by examiner

ELECTROMAGNETIC ACTUATOR

CROSS-REFERENCE TO RELATED APPLICATION

This application is a nonprovisional and claims the benefit under 35 U.S.C. § 119(e) of U.S. Provisional Patent Application No. 63/404,075, filed Sep. 6, 2022, the contents of which are incorporated herein by reference as if fully disclosed herein.

FIELD

The described embodiments generally relate to electromagnetic actuators, such as electromagnetic actuators that function as haptic actuators.

BACKGROUND

Many electronic devices include a haptic actuator. For example, haptic actuators may be included in smartphones, computers (e.g., tablet computers or laptop computers), wearable electronic devices (e.g., electronic watches or health monitors), and game controllers. A haptic actuator can give a user of an electronic device a tactile notification of an event (e.g., an alarm or an alert). In some cases, a haptic actuator may be driven using different electrical waveforms, which different electrical waveforms produce different types of tactile notifications associated with different types of events.

One type of haptic actuator is an electromagnetic actuator, in which a movable component is electromagnetically moved with respect to a stationary component to provide a haptic output (e.g., a vibration or a tap).

SUMMARY

Embodiments of the systems, devices, methods, and apparatus described in the present disclosure are directed to electromagnetic actuators, such as electromagnetic actuators that function as haptic actuators. More particularly, the present disclosure describes ways to mount an electromagnetic actuator within a housing, ways to streamline the assembly of an electromagnetic actuator's housing, and/or ways to provide other advantages relevant to electromagnetic actuators.

In a first aspect, the present disclosure describes an electronic device. The electronic device may include a housing, which housing may include a first plate defining a first wall; a cover defining a second wall opposite the first wall, a first sidewall, and a second sidewall opposite the first sidewall; and a second plate and a third plate, respectively defining a third sidewall, and a fourth sidewall opposite the third sidewall. The first, second, third, and fourth sidewalls may extend between the first wall and the second wall. The electronic device may further include a movable mass disposed within the first, second, third, and fourth sidewalls of the housing; a first spring and a second spring, respectively attached to first and second opposite ends of the movable mass; and a first material and a second material, respectively joining the first spring to the second plate and the second spring to the third plate.

In another aspect, the present disclosure describes another electronic device. The electronic device may include a first plate and a second plate; a first spring and a second spring; a first material molded over a portion of the first spring and a portion of the first plate; a second material molded over a portion of the second spring and a portion of the second plate; a movable mass positioned between the first spring and the second spring; a third plate, perpendicular and attached to the first plate and the second plate; and a cover attached to the first plate and the second plate and defining a wall perpendicular to the first plate and the second plate. The third plate and the wall may be disposed on opposite sides of the movable mass.

In another aspect, the present disclosure describes another electronic device. The electronic device may include a housing. The housing may include a first plate defining a first wall; a second plate perpendicular to the first plate and defining a second wall; a third plate perpendicular to the first plate and defining a third wall; and a cover defining a fourth wall parallel to the first wall, a fifth wall, and a sixth wall. The fifth wall may be perpendicular to the first wall, the second wall, and the third wall. The sixth wall may be parallel to the fifth wall. Each of the first plate, the second plate, the third plate, and the cover may define one or more tabs that engage a respective one or more notches on a respective one of the first plate, the second plate, the third plate, and the cover. The electronic device may further include an electromagnetic assembly mounted within the housing.

In addition to the exemplary aspects and embodiments described above, further aspects and embodiments will become apparent by reference to the drawings and by study of the following description.

BRIEF DESCRIPTION OF THE SEVERAL VIEWS OF THE DRAWINGS

The disclosure will be readily understood by the following detailed description in conjunction with the accompanying drawings, wherein like reference numerals designate like structural elements, and in which.

Figure 1A:
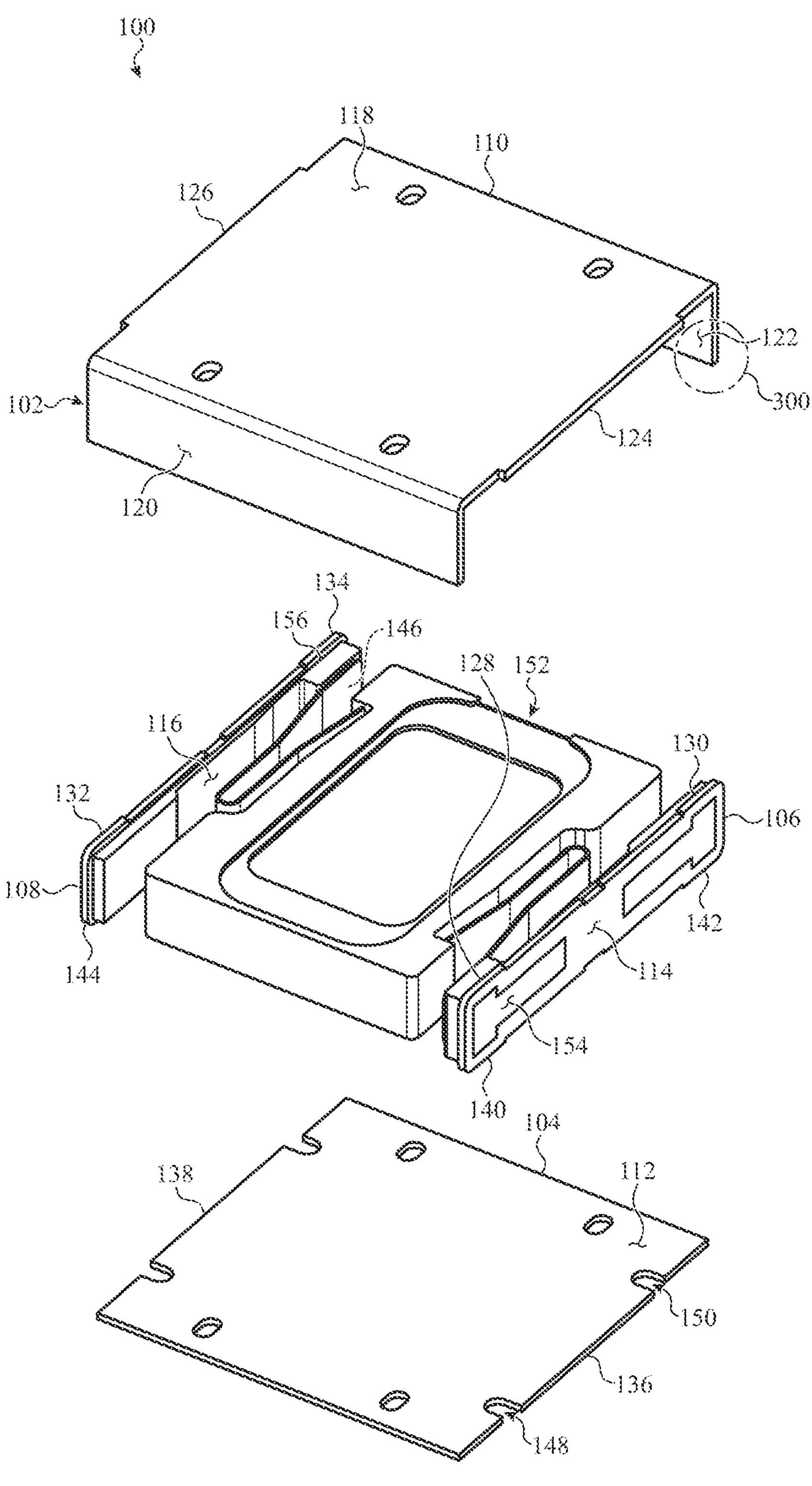
FIG. 1A shows an exploded isometric view of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

An electromagnetic actuator (e.g., a haptic actuator for delivering haptic feedback to a user of an electronic device) may include a movable mass (e.g., one or more magnets and possibly additional mass) suspended by a pair of springs. The movable mass may be caused to move between a pair of stationary electric coils. The movable mass and electric coils may be mounted within a steel housing, part or all of which may be ferromagnetic. The housing provides structural support for the electromagnetic assembly (e.g., the movable mass, the springs that support the movable mass, and the electric coils). The housing may also include mounting brackets for integrating the actuator into a system, or may provide structure to which mounting brackets may be attached for system integration. Typically, the housing is formed of ferromagnetic steel. The ferromagnetic steel provides a magnetic flux return path that improves actuator performance (e.g., efficiency), increases the force output of the actuator, and provides magnetic flux shielding to components positioned near the actuator.

Some actuator housings include two sheet metal strips having 90-degree bends (i.e., "L-frames") that are welded together to create a rectangular sidewall "hoop." Springs attached to an electromagnetic assembly are then welded to mounting plates, and the mounting plates are then welded to interior walls of the hoop. Top and bottom plates are then welded to the hoop to complete the actuator housing. Other actuator housings use a deep-drawn component (i.e., a "tub") in lieu of the hoop and top plate. This reduces the part count of the actuator housing from four to two and can save cost. With the tub-based housing, the springs attached to the movable mass are again welded to mounting plates, and the mounting plates are then welded to the interior walls of the tub. A bottom plate is then welded to the tub to complete the actuator housing. In each of the hoop and tub actuator housings, the movable mass and springs "float" relative to the hoop or tub and rely on assembly fixtures to set the correct sidewall clearances and alignment.

Despite the overall cost saving of the tub housing, a tub is a challenging part to manufacture due to the deep drawing process. Common issues are cracks and wrinkles in the sidewall and corners, where the tub material experiences high strain. Due to the manufacturing challenges of forming a deep drawn tub, a tub is still a relatively expensive part. A further drawback of a tub is that, to prevent sidewall cracks in the tub material, a tub material having a larger material thickness may be needed, which reduces the interior space within the tub (or requires a housing having larger dimensions). To enable the thicker material to be formed into a tub, the thicker material needs to be softer (e.g., a softer ¼H grade steel), which can be less robust in drop events and impact an actuator's reliability.

Described herein is an actuator housing that uses concepts such as a U-shaped cover and/or a molding (e.g., overmolding) process. These concepts can reduce the part count of an actuator, reduce the cost of the electromagnetic assembly, reduce the complexity of attaching the electromagnetic assembly to the actuator housing, reduce the cost of assembling actuator housing components, and so on. Instead of welding a movable mass to a pair of springs, and welding the pair of springs to respective mounting plates, the movable mass, springs, and plates can be attached by molding a material (e.g., plastic) around various portions of the movable mass, springs, and plates. In some cases, a material may be molded on or around all of the components in a single operation or single sequence of operations. Instead of welding the plates to a hoop or tub, the plates may then directly form a pair of opposite sidewalls of the actuator housing.

The U-shaped cover may be formed by bending a piece of sheet metal. The movable mass, springs, and attached plates may be dropped into the cover, and the plates, along with the walls of the cover, may complete a sidewall of the actuator housing. The U-shaped cover serves as the "chassis" of the housing and can provide critical datum surfaces for the plates attached to the movable mass, as well as critical datum surfaces for a bottom plate that is attached to the cover for final module assembly. In some embodiments, the movable mass, spring, and end plates may be fully constrained and aligned as they are inserted into the cover (e.g., as the result of datum surfaces and other features of the cover forcing a proper constraint and alignment of these components). This can simplify assembly by eliminating fixtures that were previously needed to set critical assembly tolerances.

The bending operation used to form the U-shaped cover is typically much simpler than the deep drawing process used to form a tub, which can produce time and cost savings. Furthermore, forming the U-shaped cover from an initially flat sheet metal stock enables holes for the routing of electric coil lead wires or an FPC, inspection holes, and/or other features to be punched or stamped before the flat sheet metal stock is bent into a U-shape, which reduces manufacturing complexity compared to punching features in a tub.

Because the mounting plates are not part of the magnetic flux circuit of the electromagnetic assembly, and therefore do not need to be ferromagnetic, the mounting plates may be formed of a non-ferromagnetic material that is harder than the cover and bottom plate, which non-ferromagnetic and harder material may provide better weldability and/or allow the thickness of the mounting plates to be reduced while maintaining adequate weld strength and drop impact robustness.

The housings with U-shaped covers that are described herein can maintain or improve on the performance characteristics of similar hoop and tub-based housings; provide improved force density; and enable system feature gains such as improved force density and space savings. In traditional hoop and tub-based housings, the mounting plates attached to the springs, in combination with the sidewall formed by the hoop or tub, increase the actuator housing size compared to a U-shaped cover housing that only uses the mounting plates as the sidewalls.

Housings based on U-shaped covers can also help lower the manufacturing scrap rate and improve overall actuator reliability.

Described herein with reference to FIGS. 1A-5 are systems, devices, methods, and apparatus that, in some cases, improve the operation of an electromagnetic or haptic actuator, reduce its part count and the number of process steps needed to manufacture the actuator, and/or provide various other advantages.

Directional terminology, such as "top", "bottom", "upper", "lower", "front", "back", "over", "under", "above", "below", "left", or "right" is used with reference to the orientation of some of the components in some of the figures described below. Because components in various embodiments can be positioned in a number of different orientations, directional terminology is used for purposes of illustration only and is usually not limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 1B:
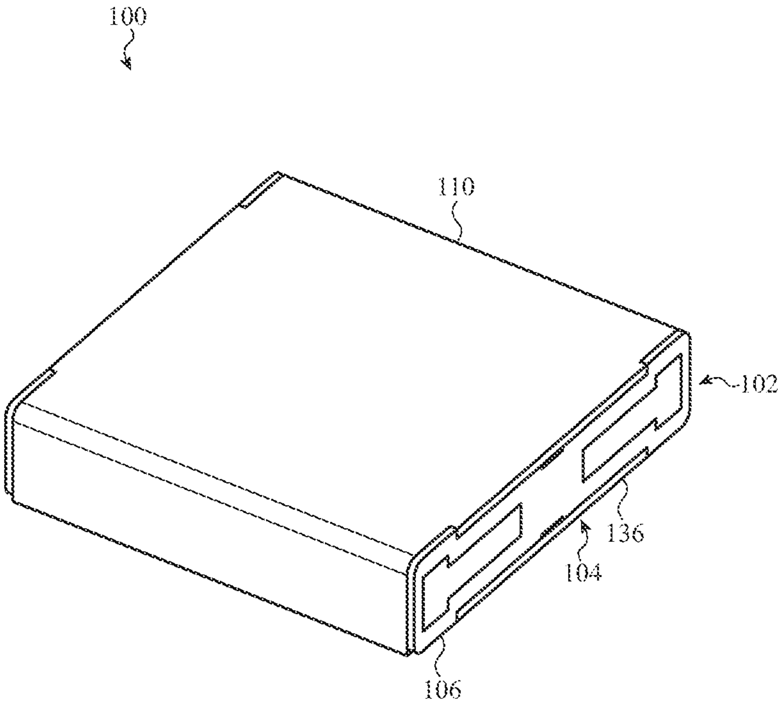
FIG. 1B shows an assembled isometric view of the electronic device described with reference to FIG. 1A.

FIG. 1A shows an exploded isometric view of an electronic device 100, and FIG. 1B shows an assembled isometric view of the electronic device 100. In some embodiments, the electronic device 100 may be an electromagnetic actuator and/or haptic actuator, such as a haptic actuator usable in a mobile phone, a wearable device, a sleep or health monitoring device, a tablet computer, a keyboard, or a game controller.

The electronic device 100 may include a housing 102. The housing 102 may include a first plate 104, a second plate 106 perpendicular to the first plate 104, a third plate 108 perpendicular to the first plate 104, and a cover 110 (e.g., a U-shaped cover). The first plate 104 may define a first wall 112. The second plate 106 may define a second wall 114. The third plate 108 may define a third wall 116 that is parallel and opposite to (i.e., on an opposite side of the housing 102 from) the second wall 114. The cover 110 may define a fourth wall 118 that is parallel and opposite to the first wall 112; a fifth wall 120 that is perpendicular to each of the first wall 112, the second wall 114, and the third wall 116; and a sixth wall 122 that is parallel and opposite to the fifth wall 120. The first and fourth walls 112, 118 may be considered primary walls of the housing 102, and the second, third, fifth, and sixth walls 114, 116, 120, 122 may be considered sidewalls of the housing 102, with the sidewalls extending between the primary walls. For purposes of this disclosure, "perpendicular" means truly perpendicular or within a range of ±10 degrees of truly perpendicular.

In some embodiments, the cover 110 may be formed by bending a sheet stock to define the fourth, fifth, and sixth walls 118, 120, 122. The sheet stock may be stamped or punched, prior to or after bending, to form other features in the cover 110.

The various components of the housing 102 (e.g., the first plate 104, the second plate 106, the third plate 108, and the cover 110) may be attached in various ways. In some embodiments, the second and third plates 106, 108 may be initially attached (e.g., welded, fastened, adhesively bonded, or otherwise attached) to the cover 110. By way of example, edges of the second plate 106, the third plate 108, and the cover 110 may define one or more tabs 124, 126, 128, 130, 132, 134 and notches that assist in aligning and registering the second and third plates 106, 108 to the cover 110. By way of example, the cover 110 is shown to have central tabs 124, 126 extending from respective opposite edges of the fourth wall 118. The tabs 124, 126 may engage respective notches defined by edges of the second and third plates 106, 108. Similarly, the second and third plates 106, 108 are each shown to have a pair of peripheral tabs 128/130 or 132/134 that extend from edges of the second and third plates 106, 108 and engage respective notches defined by edges of the cover 110. The various tabs and notches may engage each other snugly or loosely. In alternative embodiments, the second and third plates 106, 108 and cover 110 may have different arrangements of tabs and notches, or no tabs or notches.

After the second and third plates 106, 108 are attached to the cover 110, the first plate 104 may be attached (e.g., welded, fastened, adhesively bonded, or otherwise attached) to the second and third plates 106, 108 and fifth and sixth walls 120, 122 of the cover 110, thereby completing the housing 102. By way of example, edges of the first plate 104, the second plate 106, and the third plate 108 may define one or more tabs 136, 138, 140, 142, 144, 146 and notches that assist in aligning and registering the first plate 104 to the second and third plates 106, 108. By way of example, the first plate 104 is shown to have central tabs 136, 138 extending from respective opposite edges of the first wall 112. The tabs 136, 138 may engage respective notches defined by edges of the second and third plates 106, 108. Similarly, the second and third plates 106, 108 are each shown to have a pair of peripheral tabs 140/142 or 144/146 that extend from edges of the second and third plates 106, 108 and engage respective notches defined by edges of the first plate 104. The various tabs and notches may engage each other snugly or loosely. In alternative embodiments, the first, second, and third plates 104, 106, 108 may have different arrangements of tabs and notches, or no tabs or notches.

In some embodiments, edges of the fifth and sixth walls 120, 122 may abut a surface of the first plate 104 after the first plate 104 is attached to the second and third plates 106, 108 and cover 110. Optionally, the edges of the fifth and sixth walls 120, 122 and edges of the first plate 104 may include tabs and notches that mate similarly to how the tabs and notches of the cover 110 and first plate 104 mate with the tabs and notches of the second and third plates 106, 108.

In some embodiments, one or each of the tabs 136, 138 defined by the first plate 104 may be bounded by a pair of notches (e.g., notches 148 and 150 bordering tab 136). Each notch 148, 150 may begin at an edge of the first plate 104 and extend under an edge of the second plate 106. Similarly notches beginning at an opposite edge of the first plate 104 may extend under an edge of the third plate 108. Each pair of notches 148, 150 allows a respective tab 136 to flex, which enables the tab 136 to be bent (or bend) if manufacturing tolerances result in variations in the sizes of housing components and/or the payload housed within the housing 102. This enables the tabs 136 and/or 138 to be bent toward a respective one of the second or third plates 106, 108 for the purpose of welding or otherwise attaching the tab 136, 138 to the second or third plate 106, 108.

In some embodiments, a payload 152 may be mounted within the housing 102. The payload 152 may include, for example, a movable mass and/or an electromagnetic assembly including a movable mass. The housing 102 may alternatively or additionally house other components.

Figure 2:
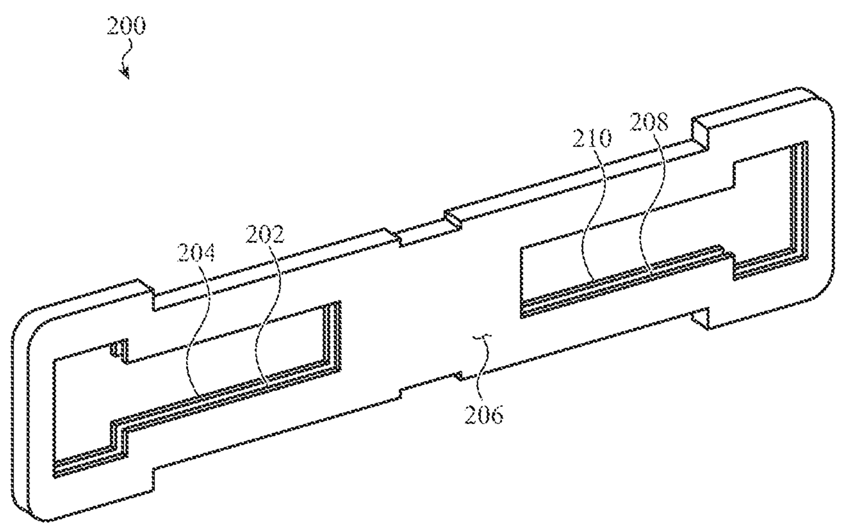
FIG. 2 shows an isometric view of an example recessed ledge and hole that may be provided in a plate of the sidewall shown in FIGS. 1A and 1B.

In some embodiments, part or all of the payload 152 may be attached to the second and third plates 106, 108, prior to the attachment of the second and third plates 106, 108 to the cover 110. In some embodiments, a first material 154 may attach the payload 152 to the second plate 106, and a second material 156 may attach the payload 152 to the third plate 108. The first and second materials 154, 156 may be the same material, or may be physically separated by other materials and/or components of the payload 152. In some embodiments, the first and second materials 154, 156 may include metal (which may be welded to the second and third plates 106, 108) or plastic (which may be molded (e.g., overmolded) on or around the second and third plates 106, 108). FIG. 2 shows an isometric view of an example recessed ledge 202 and hole 204 that may be provided in a plate 200 (e.g., the second plate 106 or the third plate 108) of the sidewall shown in FIGS. 1A and 1B. The recessed ledge 202 may be formed on an exterior surface 206 of the plate 200 (i.e., a surface exterior to a housing including the plate 200), and may fully or partially surround the hole 204. A material (e.g., plastic) that joins a payload (e.g., the payload 152) to the plate 200 may extend from an interior surface of the plate 200 (i.e., a surface interior to a housing including the plate 200), through the hole 204, and over the recessed ledge 202. In some embodiments, the plate 200 may include one or more additional recessed ledges 208 and holes 210, with each recessed ledge 208 fully or partially surrounding a respective hole 210. In some embodiments, the recessed ledge(s) 202, 208 may not be provided, and the material that joins a payload (e.g., the payload 152) to the plate 200 may extend from the interior surface of the plate 200, through the hole 204, and over at least a portion of the exterior surface 206 of the plate 200.

Returning to FIGS. 1A and 1B, it is noted that, when bending a sheet stock to form the fifth and sixth walls 120, 122, and in some embodiments, the fifth and sixth walls 120, 122 may be formed to be perpendicular to the fourth wall 118. In other embodiments, the fifth and sixth walls 120, 122 may be formed to bow outward (i.e., away from each other) or inward (i.e., toward each other). When the fifth and sixth walls 120, 122 bow inward, the payload 152 may apply pressure to the fifth and sixth walls 120, 122 as the second and third plates 106, 108 are moved into position for attachment to the cover 110. The pressure may help self-center the payload 152 between the fifth and sixth walls 120, 122. In some embodiments, the fifth and sixth walls 120, 122 may move into perpendicular positions with respect to the fourth wall 118 as the second and third plates 106, 108 are moved into position for attachment to the cover 110. Regardless, there is a possibility that the fifth wall 120 or sixth wall 122 may scrape the payload 152 and create splinters, burrs, or other features that interfere with attaching the first plate 104 to the second or third plate 106, 108.

Figure 3A:
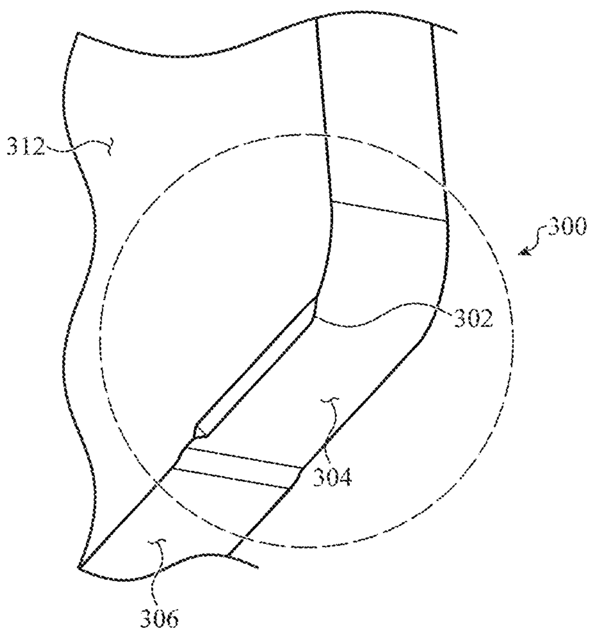
FIGS. 3A and 3B show an example edge detail that may be used for various walls of the housing described with reference to FIGS. 1A and 1B.
Figure 3B:
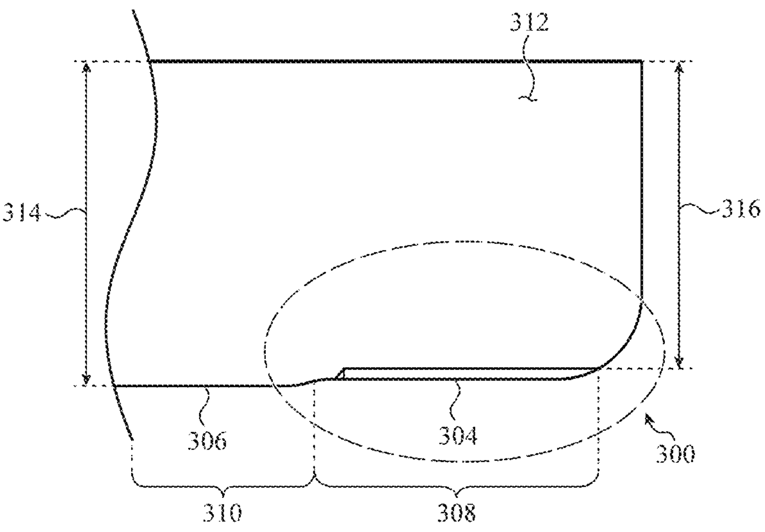

To reduce the chance of a splinter or burr being formed, and/or to reduce the chance of a splinter or burr from interfering with attachment of the first plate 104 to the second or the third plate 106, 108, FIGS. 3A and 3B show an example edge detail 300 that may be used on the edges of the fifth and sixth walls 120, 122 (see, e.g., the callout 300 in FIG. 1A). In particular, the edge detail 300 may be used on the edges of the fifth and sixth walls 120, 122 that are adjacent the first wall 112.

As shown in FIGS. 3A and 3B, the edge detail 300 may include one or both of a chamfer 302 or a recess 304. The chamfer 302 is interior to the housing 102 and reduces the likelihood that the edge 306 scrapes against an adjacent material (e.g., the payload 152 described with reference to FIG. 1A). The chamfer 302 may also assist in centering the payload 152 between the fifth and sixth walls 120, 122 of the cover 110. As an alternative to the chamfer 302, the edge 306 may be rounded to reduce the chance that the edge 306 will scrape against an adjacent material. The recess 304 provides an area for splinters or burrs (e.g., plastic burrs formed from the edge 306 scraping against an adjacent plastic material) to collect, should they be formed, without interfering with the attachment of the first plate 104 to the cover 110. The recess 304 also prevents any burrs (e.g., metal burrs) formed on the edge 306 or chamfer 302, during manufacture (e.g., stamping or machining) of the edge 306 or chamfer 302, from interfering with the attachment of the first plate 104 to the cover 110.

In some cases, a payload may have different widths between the fifth and sixth walls 120, 122, and the edges of the fifth and sixth walls 120, 122 may only be scraped, if at all, at only particular points along the edges. In these cases, the edges of the fifth and sixth walls 120, 122 may be recessed only at points where scraping is possible. For example, FIGS. 3A and 3B show an edge 306 that is recessed at one portion 308 of the edge 306, but not at another portion 310 of the edge 306. The recess 304 gives the wall 312 having the edge 306 a first height 314 at a first portion 310 of the wall 312, and a second height 316 at a second portion 308 of the wall 312, with the second height 316 being less than the first height 314. In some embodiments, only the second portion 308 of the wall 312 may be adjacent a material of a payload (e.g., payload 152) that could be scraped.

Returning again to FIG. 1A, the likelihood of splinters and burrs can also be reduced by tapering portions of the payload 152 that may rub against the interior surfaces of the fifth and sixth walls 120, 122. In particular, at least portions of the sidewalls of the payload 152 may taper inward as the at least portions of the sidewalls of the payload extend toward the cover 110. The tapered portions may also aid in self-centering the payload 152 between the fifth and sixth walls 120, 122.

Figure 4:
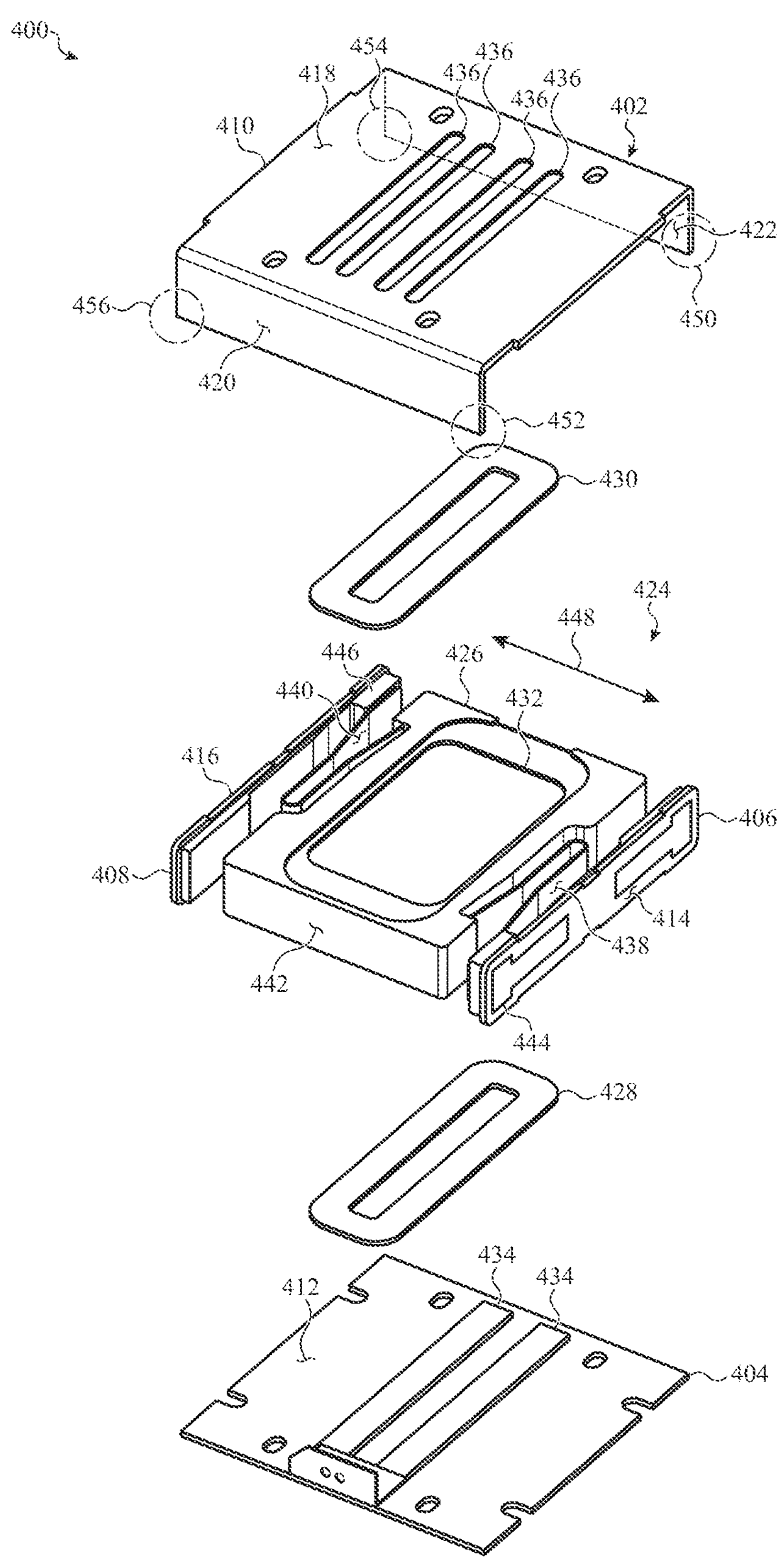
FIG. 4 shows an exploded isometric view of a second example electronic device.

FIG. 4 shows an exploded isometric view of a second example electronic device 400. In some embodiments, the electronic device 400 may be an electromagnetic actuator and/or haptic actuator, such as a haptic actuator usable in a mobile phone, a wearable device, a sleep or health monitoring device, a tablet computer, a keyboard, or a game controller.

The electronic device 400 may include a housing 402. The housing 402 may include a first plate 404, a second plate 406 perpendicular to the first plate 404, a third plate 408 perpendicular to the first plate 404, and a cover 410 (e.g., a U-shaped cover). The first plate 404 may define a first wall 412. The second plate 406 may define a second wall 414. The third plate 408 may define a third wall 416 that is parallel and opposite to (i.e., on an opposite side of the housing 402 from) the second wall 414. The cover 410 may define a fourth wall 418 that is parallel and opposite to the first wall 412; a fifth wall 420 that is perpendicular to each of the first wall 412, the second wall 414, and the third wall 416; and a sixth wall 422 that is parallel and opposite to the fifth wall 420. The first and fourth walls 412, 418 may be considered primary walls of the housing 402, and the second, third, fifth, and sixth walls 414, 416, 420, 422 may be considered sidewalls of the housing 402, with the sidewalls extending between the primary walls.

The first plate 404, second plate 406, third plate 408, and cover 410 may include features similar to those of the plates and cover described with reference to FIGS. 1A-3, and may be attached similarly to how the first plate, second plate, third plate, and cover are attached in FIGS. 1A and 1B.

An electromagnetic assembly 424 may be housed within the housing 402. By way of example, the electromagnetic assembly 424 may include one or more stationary components attached to the housing 402, and one or more movable components (or a movable mass 426) that can be moved with respect to the stationary components. By way of further example, the stationary components of the electronic device 400 may include a pair of electric coils (i.e., a first electric coil 428 and a second electric coil 430), and the movable mass 426 may include a magnet 432 (e.g., one or more permanent magnets).

The first electric coil 428 may be positioned between the movable mass (or magnet 432) and third plate 408 and attached (directly or indirectly) to the first wall 412 of the housing 402. The second electric coil 430 may be positioned between the movable mass (or magnet 432) and cover 410 and attached (directly or indirectly) to the fourth wall 418 of the housing 402.

Each of the electric coils 428, 430 may be electrically insulated from the housing 402 and electrically coupled to a circuit (e.g., a flexible printed circuit (FPC)) that selectively energizes and de-energizes the electric coils 428, 430 (e.g., by selectively applying an alternating current to the electric coils 428, 430). In some embodiments, the electric coils 428, 430 may be separated from the first and fourth walls 412, 418 of the housing 402 by one or more ribs or other features 434, 436. As shown, the ribs or other features 434, 436 may be half shear features that protrude from the first and fourth walls 412, 418 into the housing 402. A half shear feature is a feature formed, for example, by stamping the feature into a surface. By way of example, the first wall 412 is shown to have two half shear features 434, in the form of parallel ribs. In some embodiments, the ribs may be oriented perpendicular to a direction of travel of the movable mass 426. In other embodiments, the ribs may be oriented or laid out in other ways, or the first wall 412 may include other shapes and/or orientations of half shear features. By way of example, the fourth wall 418 is shown to have four half shear features 436, in the form of parallel ribs. In some embodiments, the ribs may be oriented perpendicular to a direction of travel of the movable mass 426. In other embodiments, the ribs may be oriented or laid out in other ways, or the fourth wall 418 may include other shapes and/or orientations of half shear features. Alternatively, the features 434, 436 may be formed apart from the housing 402 and attached (e.g., welded, fastened, or adhesively bonded) to the first and fourth walls 412, 418 of the housing 402.

By way of example, each electric coil 428, 430 is formed as a substantially planar racetrack having a dimension perpendicular to an axis of travel 448 of the movable magnet 432 that is greater than a dimension parallel to the axis of travel 448. Each racetrack includes multiple loops of coil wire. In other embodiments, the electric coils 428, 430 may have other shapes or dimensions. In some embodiments, the electromagnetic assembly 424 may only include one of the electric coils 428 or 430. In some embodiments, movement of the movable magnet 432 may be optionally guided by a spindle or rails that extend along the axis of travel 448.

The device 400 may include a pair of springs (i.e., a first spring 438 and a second spring 440). In some embodiments, each of the first and second springs 438, 440 may be a flexure spring (e.g., a spring formed from a single piece of material having different sections that are biased apart from one another, or a spring including multiple segments that are joined at some points and biased apart from one another at other points). The first and second springs 438, 440 may be respectively attached (directly or indirectly) to first and second opposite ends of the movable mass 426 (i.e., with the movable mass 426 positioned between the first and second springs 438, 440). In some embodiments, the movable mass 426 may include a magnet 432 and one or more materials 442 molded (e.g., overmolded) on or around the magnet 432. Alternatively, the one or more materials 442 may not be molded around the magnet 432 and the magnet 432 may be attached (e.g., adhesively bonded or welded) to the molded material(s) 442 after the material(s) 442 are molded. Alternatively, the one or more materials 442 may be molded around a substrate or other component that serves as a carrier for the magnet 432. In any of these embodiments, the one or more materials 442 may also be molded (e.g., overmolded) on or around portions of the first and second springs 438, 440. In some embodiments, the one or more materials 442 may include plastic.

In addition to being attached to the movable mass 426, the first spring 438 may also be attached to the second plate 406, and in some cases may be attached to the second plate 406 by a first material 444. In addition to being attached to the movable mass 426, the second spring 440 may also be attached to the third plate 408, and in some cases may be attached to the third plate 408 by a second material 446. In some embodiments, the first and second materials 444, 446 may include metal (which may be welded to respective portions of the first or second springs 438, 440 and second or third plates 406, 408) or plastic (which may be molded (e.g., overmolded) on or around respective portions of the first or second springs 438, 440 and second or third plates 406, 408). In some embodiments, the first and second materials 444, 446 may be attached to the second and third plates 406, 408 as described with reference to FIGS. 1A-2.

Figure 5:
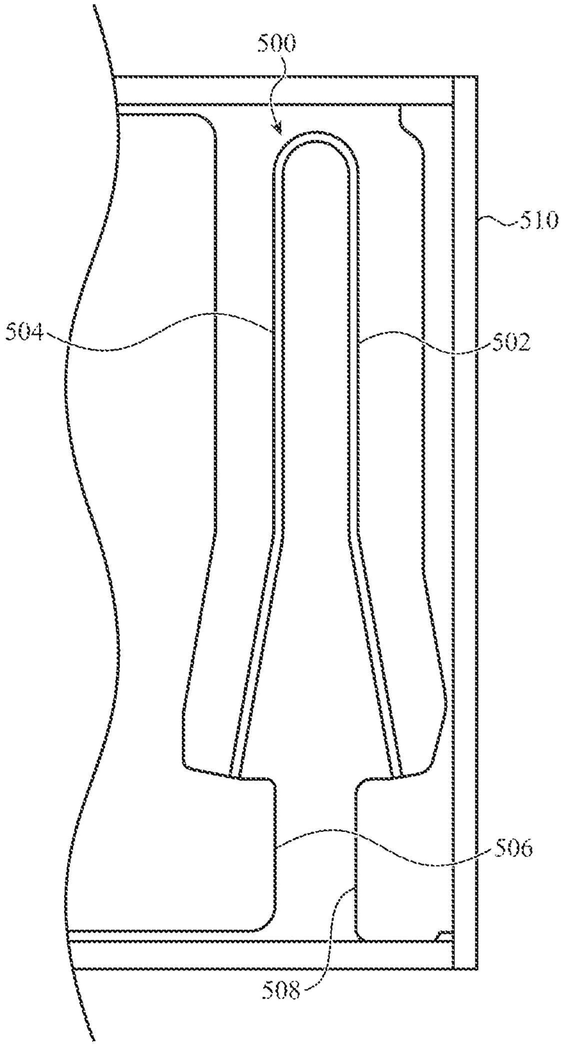
FIG. 5 shows an example plan view of a spring shown in FIG. 4.

FIG. 5 shows an example plan view of a spring 500, which in some cases may be the spring 438 or 440 described with reference to FIG. 4. As shown, the spring 500 may be a flexure spring having one or more bends defining one or more arm segments 502, 504. In some embodiments, the spring 500 may have a tweezer-like shape. In other embodiments, the spring 500 may have an accordion shape or spiral shape.

A first end of the spring 500 may be embedded in a material 506 that is molded on or around the first end of the spring 500 and a portion of a movable mass. A second end of the spring 500 may be embedded in a material 508 that is molded on or around the second end of the spring 500 and a portion of a plate 510 (e.g., the second or third plate 406, 408 described with reference to FIG. 4).

Returning to FIG. 4, the electromagnetic assembly 424 is operated by applying an alternating current to the electric coils 428, 430. As current flows through the electric coils 428, 430, it induces a magnetic field that causes the movable mass 426, and included magnet 432, to translate back and forth along an axis of travel 448. The pair of springs 438, 440 may bias the movable mass 426 toward a position of rest between the pair of springs 438, 440, and may alternately store and release mechanical energy to assist the electric coils 428, 430 in moving the movable mass 426.

The first plate 404 and cover 410 may be ferromagnetic. The features 434, 436 may also be ferromagnetic. The first plate 404, cover 410, and features 434, 436 help contain, direct, and concentrate magnetic flux within the electromagnetic assembly 424. The second and third plates 406, 408 may also be ferromagnetic, but need not be. In some embodiments, the second and third plates 406, 408 may be non-ferromagnetic, and may be formed of a harder material than the first plate 404 and cover 410. This can improve the strength of welds between the second and third plates 406, 408 and the first plate 404 or cover 410.

Each of the encircled areas 450, 452, 454, and 456 may include the edge detail shown in FIGS. 3A and 3B (i.e., a chamfer and/or a recess along portions of an edge of the fifth or sixth wall 420, 422). The chamfers can reduce the likelihood of a splinter or burr forming as a result of the fifth or sixth wall 420, 422 scraping the material 444 or 446 as the second and third plates 406, 408 are moved into position for attachment to the cover 410. The recesses provide voids where splinters or burrs can collect, if formed.

The likelihood that splinters or burrs will form can also be reduced by tapering portions of the material 444 or 446. In particular, at least portions of the sidewalls of the material 444 or 446 may be tapered inward as the at least portions of the sidewalls extend toward the cover 410. The tapered portions may also aid in self-centering the movable mass 426 between the fifth and sixth walls 420, 422 of the cover 410.

In some embodiments, various components may be positioned or routed between adjacent half shear features 434 or 436. For example, an FPC or electric coil lead wires may extend between adjacent ones of the half shear features 434 or 436 (e.g., between adjacent ribs). An FPC or electric coil lead wires may also be routed through a hole in the housing 402 and electrically coupled to a controller or other circuitry outside of the housing 402.

Although the various covers described herein are shown to define a top portion of a housing, it is noted that any of the devices may be placed in a different orientation, and the term "cover" is not intended to imply a component that defines a top portion of a housing. A cover may variously define a bottom or side of a housing. It is also noted that various mounting brackets or features may be attached to, or formed on, any of the covers, plates, or walls described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The invention claimed is:

1. An electronic device, comprising:

a housing including, a first plate defining a first wall;

a cover separate from the first plate and defining a second wall opposite the first wall, a first sidewall, and a second sidewall opposite the first sidewall; and a second plate and a third plate, each separate from the first plate and the cover, respectively defining a third sidewall, and a fourth sidewall opposite the third sidewall, the first, second, third, and fourth sidewalls extending between the first wall and the second wall;

a movable mass disposed within the first, second, third, and fourth sidewalls of the housing;

a first spring and a second spring, respectively attached to first and second opposite ends of the movable mass; and a first material segment and a second material segment, respectively joining the first spring to the second plate and the second spring to the third plate.

2. The electronic device of claim 1, wherein the first sidewall defines an edge, the edge is adjacent the first wall, the edge includes a chamfer, and the chamfer is interior to the housing.

3. The electronic device of claim 2, wherein a first portion of the first sidewall has a first height, a second portion of the first sidewall has a second height, the second portion is adjacent the first material segment, and the second height is less than the first height.

4. The electronic device of claim 1, wherein a first portion of the first sidewall has a first height, a second portion of the first sidewall has a second height, the second portion is adjacent the first material segment, and the second height is less than the first height.

5. The electronic device of claim 1, wherein the first material segment and the second material segment comprise plastic.

6. The electronic device of claim 1, wherein the first material segment is molded on or around a first portion of the first spring.

7. The electronic device of claim 1, wherein:

the second plate defines a recessed ledge surrounding a hole;

the recessed ledge is on an exterior surface of the second plate; and the first material segment extends through the hole and overlaps at least a portion of the recessed ledge.

8. The electronic device of claim 1, wherein:

the second plate defines a hole; and the first material segment extends through the hole and overlaps at least a portion of an exterior surface of the second plate.

9. The electronic device of claim 1, wherein the first plate defines a pair of notches, each notch of the pair of notches beginning at a first edge of the first plate and extending under a second edge of the second plate.

10. An electronic device, comprising:

a first plate and a second plate separate from the first plate;

a first spring and a second spring;

a first material segment molded over a portion of the first spring and a portion of the first plate;

a second material segment molded over a portion of the second spring and a portion of the second plate;

a movable mass positioned between the first spring and the second spring;

a third plate, separate from each of the first plate and the second plate, perpendicular and attached to the first plate and the second plate; and a cover, separate from each of the first plate, the second plate, and the third plate, attached to the first plate and the second plate and defining a wall perpendicular to the first plate and the second plate, the third plate and the wall disposed on opposite sides of the movable mass.

11. The electronic device of claim 10, wherein the cover further defines first and second opposing sidewalls connecting the third plate and the wall about the movable mass.

12. The electronic device of claim 11, wherein:

the first material segment and the second material segment have respective sides facing respective ones of the first and second opposing sidewalls; and at least portions of the respective sides of the first material segment and the second material segment taper inward as the at least portions of the respective sides extend toward the cover.

13. The electronic device of claim 10, wherein the movable mass comprises a magnet.

14. The electronic device of claim 13, further comprising:

a first electric coil positioned between the movable mass and the third plate; and a second electric coil positioned between the movable mass and the cover.

15. The electronic device of claim 10, wherein the movable mass comprises:

a magnet; and a third material segment molded around the magnet.

16. The electronic device of claim 15, wherein the first material segment, the second material segment, and the third material segment comprise plastic.

17. The electronic device of claim 10, wherein the first spring and the second spring are flexure springs.

18. The electronic device of claim 10, wherein:

the third plate and the cover are ferromagnetic; and the first plate and the second plate are non-ferromagnetic.

19. An electronic device, comprising:

a housing including, a first plate defining a first wall;

a second plate, separate from the first plate, perpendicular to the first plate and defining a second wall;

a third plate, separate from each of the first plate and the second plate, perpendicular to the first plate and defining a third wall; and a cover, separate from each of the first plate, the second plate, and the third plate, defining a fourth wall parallel to the first wall, a fifth wall perpendicular to the first wall, the second wall, and the third wall, and a sixth wall parallel to the fifth wall wherein:

each of the first plate, the second plate, the third plate, and the cover define one or more tabs that engage a respective one or more notches on a respective one of the first plate, the second plate, the third plate, and the cover; and an electromagnetic assembly mounted within the housing.

20. The electronic device of claim 19, wherein the cover defines an edge of the second wall, the edge abuts the first plate, the edge includes a chamfer, and the chamfer is interior to the housing.

21. The electronic device of claim 20, wherein a first portion of the second wall has a first height, a second portion of the second wall has a second height, and the second height is less than the first height.

* * * * *